United States Patent
Sudou et al.

(10) Patent No.: US 9,694,815 B2
(45) Date of Patent: Jul. 4, 2017

(54) VEHICLE DRIVING CONTROL APPARATUS

(71) Applicant: DENSO CORPORATION, Kariya, Aichi-pref. (JP)

(72) Inventors: Takuma Sudou, Obu (JP); Jin Kurumisawa, Obu (JP); Tatsuya Namikiri, Seoul (KR)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/626,098

(22) Filed: Feb. 19, 2015

(65) Prior Publication Data

US 2015/0232094 A1    Aug. 20, 2015

(30) Foreign Application Priority Data

Feb. 20, 2014  (JP) ................................ 2014-030662

(51) Int. Cl.
  *B60W 30/14*    (2006.01)
  *B60W 30/16*    (2012.01)

(52) U.S. Cl.
  CPC ......... *B60W 30/143* (2013.01); *B60W 30/16* (2013.01); *B60W 2550/302* (2013.01); *B60W 2720/106* (2013.01); *B60W 2750/308* (2013.01)

(58) Field of Classification Search
  CPC ................................................. B60W 30/143
  See application file for complete search history.

(56) References Cited

U.S. PATENT DOCUMENTS

| 5,529,139 | A |   | 6/1996 | Kurahashi et al. |
| 6,044,321 | A | * | 3/2000 | Nakamura ......... B60K 31/0008 180/179 |
| 6,269,298 | B1 |   | 7/2001 | Seto |
| 6,292,737 | B1 | * | 9/2001 | Higashimata ...... B60K 31/0008 180/167 |

(Continued)

FOREIGN PATENT DOCUMENTS

| JP | H06-255391 | 9/1994 |
| JP | H08-45000 | 2/1996 |

(Continued)

OTHER PUBLICATIONS

Office Action dated Nov. 20, 2015 in corresponding Korean Application No. 10-2015-0021368.

*Primary Examiner* — Todd Melton
*Assistant Examiner* — Jason Roberson
(74) *Attorney, Agent, or Firm* — Harness, Dickey & Pierce, P.L.C.

(57) ABSTRACT

A vehicle driving control apparatus is provided for controlling an own vehicle to track a target vehicle. The vehicle driving control apparatus includes: (1) means for acquiring an actual relative speed of the target vehicle to the own vehicle; (2) means for setting a target acceleration of the own vehicle based on the product of a relative speed gain and the actual relative speed acquired by the acquiring means, the relative speed gain being normally set to a reference gain; (3) means for detecting occurrence of an event which causes the target acceleration set by the setting means to discontinuously change; and (4) means for correcting, upon detection of occurrence of the event by the detecting means, the relative speed gain so as to gradually increase the relative speed gain from a value that is less than the reference gain.

6 Claims, 5 Drawing Sheets

(56) References Cited

U.S. PATENT DOCUMENTS

2006/0290202 A1* 12/2006 Shibata .................... B60T 7/22
303/165

FOREIGN PATENT DOCUMENTS

| | | |
|---|---|---|
| JP | 2000-038048 | 2/2000 |
| JP | 2002-087109 | 3/2002 |
| JP | 2002-087110 | 3/2002 |
| JP | 2002-178787 | 6/2002 |
| JP | 2010-143323 | 7/2010 |
| JP | 2013-193573 | 9/2013 |

* cited by examiner

VEHICLE DRIVING CONTROL APPARATUS

CROSS-REFERENCE TO RELATED APPLICATION

This application is based on and claims priority from Japanese Patent Application No. 2014-30662 filed on Feb. 20, 2014, the content of which is hereby incorporated by reference in its entirety into this application.

BACKGROUND

1 Technical Field

The present invention relates generally to vehicle driving control apparatuses. More particularly, the invention relates to a vehicle driving control apparatus that controls an own vehicle to track (or follow) a preceding vehicle which runs ahead of the own vehicle.

2 Description of Related Art

To reduce the operating burden of a driver driving a vehicle, there have been developed vehicle driving control apparatuses that select a preceding vehicle, which runs ahead of the own vehicle, as a target vehicle, and control the speed of the own vehicle so as to keep the inter-vehicle distance between the own vehicle and the target vehicle constant, thereby making the own vehicle automatically track (or follow) the target vehicle.

For example, there is disclosed a vehicle driving control apparatus (or inter-vehicle distance control apparatus) in Japanese Patent Application Publication No. JP2010143323A. The vehicle driving control apparatus is configured to perform a tracking control, i.e., a control of making an own vehicle track a target vehicle (or preceding vehicle). Moreover, the apparatus is further configured to: stop the tracking control upon start of an accelerating or decelerating operation by a driver of the own vehicle; reset (or change) a target inter-vehicle distance based on the actual inter-vehicle distance when the relative speed between the target vehicle and the own vehicle becomes 0 after completion of the accelerating or decelerating operation; and resume the tracking control with the reset target inter-vehicle distance. Consequently, when the tracking control is resumed, it is unnecessary to perform additional deceleration and acceleration of the own vehicle for maintaining the target inter-vehicle distance.

However, besides the completion of an accelerating or decelerating operation made by the driver during the tracking control, there may also occur the following events where the relative speed between the target vehicle and the own vehicle changes not gradually but discontinuously: (a) an intervening vehicle, which intervenes between the own vehicle and the target vehicle, becomes a new target vehicle to track; and (b) the driver initiates the tracking control by operating a switch. In addition, the relative speed is positive when the target vehicle runs at a higher speed than and thus gets further from the own vehicle and negative when the target vehicle runs at a lower speed than and thus gets closer to the own vehicle.

In a normal tracking control, when the relative speed between the target vehicle and the own vehicle discontinuously changes, for making the own vehicle track the target vehicle, the target acceleration of the own vehicle will be discontinuously changed, thereby suddenly accelerating or decelerating the own vehicle. Consequently, a shock will be caused by the sudden acceleration or deceleration of the own vehicle, thereby lowering the driveability of the own vehicle. In addition, this shock will be shortly referred to as acceleration shock or deceleration shock hereinafter.

The aforementioned patent document fails to disclose how to reduce the acceleration shock or deceleration shock caused by the tracking control when the target acceleration of the own vehicle is discontinuously changed.

SUMMARY

According to an exemplary embodiment, there is provided a vehicle driving control apparatus for controlling an own vehicle to track a target vehicle. The target vehicle is a preceding vehicle which runs ahead of the own vehicle and is selected by the vehicle driving control apparatus to be tracked by the own vehicle. The vehicle driving control apparatus includes: (1) means for acquiring an actual relative speed of the target vehicle to the own vehicle; (2) means for setting a target acceleration of the own vehicle based on the product of a relative speed gain and the actual relative speed acquired by the acquiring means, the relative speed gain being normally set to a reference gain; (3) means for detecting occurrence of an event which causes the target acceleration set by the setting means to discontinuously change; and (4) means for correcting, upon detection of occurrence of the event by the detecting means, the relative speed gain so as to gradually increase the relative speed gain from a value that is less than the reference gain.

Consequently, by correcting the relative speed gain in the above manner, it is possible to prevent the target acceleration from being rapidly changed due to occurrence of the event. As a result, it is possible to reduce the acceleration shock or deceleration shock caused by the tracking control when the event occurs.

It is preferable that the correcting means corrects the relative speed gain so as to gradually increase the relative speed gain from the value to the reference gain.

Preferably, the vehicle driving control apparatus further includes means for acquiring an inter-vehicle distance between the target vehicle and the own vehicle. The correcting means corrects the relative speed gain so as to gradually increase the relative speed gain from an initial gain that is calculated by the following equation: $\alpha 0 = |Vr0| / (2 \times \Delta D)$, where $\alpha 0$ represents the initial gain, $|Vr0|$ represents the absolute value of the actual relative speed of the target vehicle to the own vehicle at the time of occurrence of the event, and $\Delta D$ represents the difference between a maximum allowable inter-vehicle distance and the inter-vehicle distance between the target vehicle and the own vehicle when the actual relative speed of the target vehicle to the own vehicle is positive upon occurrence of the event and represents the difference between the inter-vehicle distance and a minimum allowable inter-vehicle distance when the actual relative speed is negative upon occurrence of the event.

Further, it is preferable that upon detection of occurrence of the event by the detecting means, the correcting means sets the relative speed gain to the initial gain as long as a first or a second correction condition is satisfied and then gradually increases the relative speed gain from the initial gain. Here, the first correction condition is such that the actual relative speed of the target vehicle to the own vehicle is positive and the inter-vehicle distance between the target vehicle and the own vehicle is shorter than or equal to the maximum allowable inter-vehicle distance; the second correction condition is such that the actual relative speed of the target vehicle to the own vehicle is negative and the inter-vehicle distance between the target vehicle and the own vehicle is longer than or equal to the minimum allowable inter-vehicle distance.

Preferably, when the actual relative speed of the target vehicle to the own vehicle is positive and higher than or equal to a first correction threshold, the correcting means sets the relative speed gain to the reference gain instead of to the initial gain. When the actual relative speed of the target vehicle to the own vehicle is positive and higher than a first estimated relative speed and lower than the first correction threshold, the correcting means corrects the initial gain so that the closer the actual relative speed is to the first correction threshold, the closer the corrected initial gain is to the reference gain. Here, the first estimated relative speed is obtained by supposing that the target acceleration of the own vehicle is kept constant; the first correction threshold is higher than the first estimated relative speed by a predetermined amount. Moreover, when the actual relative speed of the target vehicle to the own vehicle is negative and lower than or equal to a second correction threshold, the correcting means sets the relative speed gain to the reference gain instead of to the initial gain. When the actual relative speed of the target vehicle to the own vehicle is negative and lower than a second estimated relative speed and higher than the second correction threshold, the correcting means corrects the initial gain so that the closer the actual relative speed is to the second correction threshold, the closer the corrected initial gain is to the reference gain. Here, the second estimated relative speed is obtained by supposing that the target acceleration of the own vehicle is kept constant; the second correction threshold is lower than the second estimated relative speed by a predetermined amount.

The event may be one of the following: (1) a preceding vehicle is newly selected as the target vehicle; (2) an intervening vehicle, which intervenes between the target vehicle and the own vehicle, replaces the target vehicle to become a new target vehicle; (3) an operation of accelerating or decelerating the own vehicle, which is made by a driver of the own vehicle during the tracking control, is completed; and (4) the tracking control is initiated by the driver of the own vehicle.

It is preferable that the reference gain is set by the setting means based on the inter-vehicle distance between the target vehicle and the own vehicle and the speed of the own vehicle.

BRIEF DESCRIPTION OF THE DRAWINGS

The present invention will be understood more fully from the detailed description given hereinafter and from the accompanying drawings of one exemplary embodiment, which, however, should not be taken to limit the invention to the specific embodiment but are for the purpose of explanation and understanding only.

In the accompanying drawings.

DESCRIPTION OF EMBODIMENT

Figure 1:
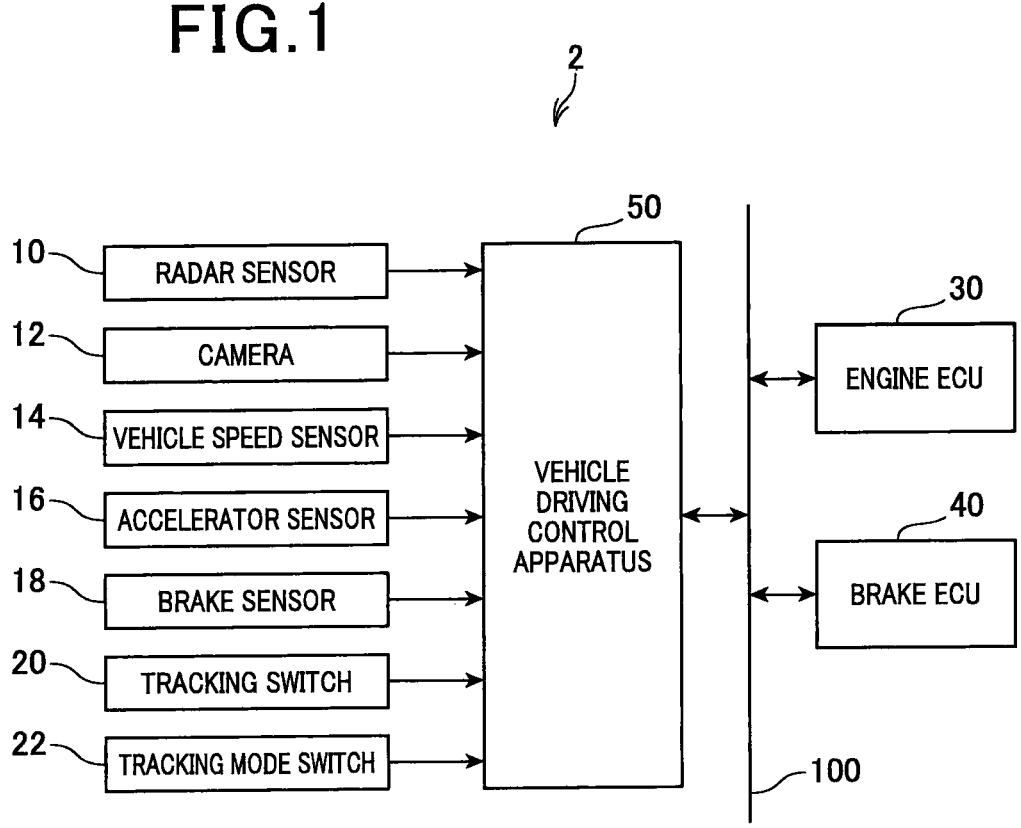
FIG. 1 is a functional block diagram illustrating the overall configuration of a vehicle driving control system which includes a vehicle driving control apparatus according to the exemplary embodiment.

FIG. 1 shows the overall configuration of a vehicle driving control system 2 which includes a vehicle driving control apparatus 50 according to an exemplary embodiment.

The vehicle driving control system 2 is installed in a vehicle (hereinafter, to be referred to as own vehicle) to control driving of the own vehicle. More specifically, the vehicle driving control system 2 is configured to select a preceding vehicle, which runs ahead of the own vehicle, as a target vehicle and control driving of the own vehicle so as to keep the inter-vehicle distance between the own vehicle and the target vehicle constant, thereby making the own vehicle automatically track (or follow) the target vehicle.

The vehicle driving control system 2 includes various sensors for detecting the surrounding situation and driving condition of the own vehicle, various switches, an engine ECU (Electronic Control Unit) 30, a brake ECU 40 and the vehicle driving control apparatus 50.

The various sensors include a radar sensor 10, a camera 12, a vehicle speed sensor 14, an accelerator sensor 16 and a brake sensor 18. The various switches include a tracking switch 20 and a tracking mode switch 22.

The radar sensor 10 is configured to: irradiate a laser beam forward over a predetermined angular range; detect a reflected light that is produced by the reflection of the laser beam by an object; determine the distance from the own vehicle to the object having reflected the laser beam based on the time required for the laser beam to make a round trip between the own vehicle and the object; and determine the azimuth of the object based on the irradiation direction of the laser beam when the reflected light is detected.

In addition, the radar sensor 10 is not limited to a radar sensor using a laser beam. Alternatively, the radar sensor 10 may be implemented by a radar sensor using radio waves in the milli-wave or micro-wave zone or a radar sensor using an ultrasonic wave.

The camera 12 is configured to take images of objects present in front of the own vehicle. The images taken by the camera 12 are then analyzed by an image analysis device (not shown in the figures) to determine whether the objects present in front of the own vehicle are obstacles or other vehicles.

The vehicle speed sensor 14 senses the speed of the own vehicle. The accelerator sensor 16 senses the amount of depressing an accelerator pedal of the own vehicle by the driver. The brake sensor 18 senses the amount of depressing a brake pedal of the own vehicle by the driver.

In addition, though it is shown in FIG. 1 that the sensing signals outputted from the vehicle speed sensor 14, the accelerator sensor 16 and the brake sensor 18 are inputted only to the vehicle driving control apparatus 50, those sensing signals are actually inputted to the engine ECU 30 and the brake ECU 40 as well.

The tracking switch 20 is provided for the driver to input a command as to whether or not to perform an Adaptive Cruise Control (ACC). The ACC is a well-known control that makes the own vehicle run at a preset target speed when there is no preceding vehicle and run within a predetermined speed range, when there is a preceding vehicle, so as to keep a predetermined inter-vehicle distance between the own vehicle and the preceding vehicle.

The tracking mode switch 22 is provided for the driver to select, as a tracking mode, both a distance mode that specifies whether to decrease or increase the inter-vehicle distance between the own vehicle and a target vehicle to track in the ACC and a speed range of the own vehicle in the ACC. In addition, the inter-vehicle distance between the own vehicle and the target vehicle may be continuously set within a predetermined range.

Each of the engine ECU 30, the brake ECU 40 and the vehicle driving control apparatus 50 is configured with a microcomputer, an A/D conversion circuit, I/O (Input/Output) interfaces and a communication circuit. The microcomputer includes a CPU (Central Processing Unit), a ROM (Read Only Memory), a RAM (Random Access Memory) and a flash memory. The communication circuit communicates with the other ECUs via an on-vehicle LAN (Local Area Network) 100.

The engine ECU 30 controls operation of an internal combustion engine of the own vehicle. For example, in the case of the engine being a gasoline engine, the engine ECU 30 controls start/stop of the engine, the amount of fuel injected into the engine and ignition timings of the engine. More specifically, the engine ECU 30 controls, based on the sensing signal outputted from the accelerator sensor 16 or a command from the vehicle driving control apparatus 50, a throttle actuator that opens and closes a throttle provided in an intake pipe of the engine, thereby increasing and decreasing the driving force of the engine.

The brake ECU 40 controls, based on the sensing signal outputted from the brake sensor 18 or a command from the vehicle driving control apparatus 50, a brake actuator that applies a braking force to the own vehicle, thereby increasing and decreasing the braking force.

The vehicle driving control apparatus 50 cyclically performs, when the command to perform the ACC is inputted by turning on the tracking switch 20, a process of selecting a preceding vehicle as a target vehicle to track. Further, the vehicle driving control apparatus 50 performs a tracking control process so as to make the own vehicle track the target vehicle. In addition, the vehicle driving control apparatus 50 sets a target inter-vehicle distance in tracking the target vehicle based on the distance mode selected by the tracking mode switch 22 and the speed of the own vehicle.

Moreover, the vehicle driving control apparatus 50 acquires the actual inter-vehicle distance between the own vehicle and the target vehicle from the radar sensor 10 and calculates the actual relative speed of the target vehicle to the own vehicle based on the change with time of the actual inter-vehicle distance.

In the tracking control process, the speed of the own vehicle is normally increased or decreased by controlling the throttle actuator by the engine ECU 30. However, when it is impossible to adjust the speed of the own vehicle to a desired value only by controlling the throttle actuator, the brake ECU 40 controls the brake actuator so as to increase or decrease the speed of the own vehicle in cooperation with the engine ECU 30.

[Tracking Control Process]

When the vehicle driving control apparatus 50 performs the tracking control so that the inter-vehicle distance between the own vehicle and the target vehicle is kept at the target inter-vehicle distance, the relative speed of the target vehicle to the own vehicle is equal to 0. Further, when the target vehicle accelerates or decelerates so that the relative speed becomes positive or negative from 0, the inter-vehicle distance between the own vehicle and the target vehicle is deviated from the target inter-vehicle distance.

In the present embodiment, when the relative speed becomes positive and thus the target vehicle gets further from the own vehicle than the target inter-vehicle distance, the vehicle driving control apparatus 50 commands the engine ECU 30 to accelerate the own vehicle so as to keep the inter-vehicle distance between the own vehicle and the target vehicle at the target inter-vehicle distance. In contrast, when the relative speed becomes negative and thus the target vehicle gets closer to the own vehicle than the target inter-vehicle distance, the vehicle driving control apparatus 50 commands the engine ECU 30 and the brake ECU 40 to decelerate the own vehicle so as to keep the inter-vehicle distance between the own vehicle and the target vehicle at the target inter-vehicle distance.

Moreover, in the present embodiment, the vehicle driving control apparatus 50 sets the target acceleration of the own vehicle in accelerating or decelerating the own vehicle by the following Equation (1):

$$Atgt = \alpha \times Vr \quad (1)$$

where Atgt is the target acceleration, α is the relative speed gain, and Vr is the actual relative speed of the target vehicle to the own vehicle.

In the normal tracking, the vehicle driving control apparatus 50 calculates, for example using a map, a reference gain based on the speed of the own vehicle and the inter-vehicle distance between the own vehicle and the target vehicle; then, the apparatus 50 sets the relative speed gain α in Equation (1) to the reference gain. In other words, the relative speed gain α is normally set to the reference gain. Moreover, when the target vehicle accelerates or decelerates during the tracking control, the actual relative speed Vr of the target vehicle to the own vehicle gradually increases or decreases from 0. Consequently, with the relative speed gain α set to the reference gain, the target acceleration Atgt of the own vehicle also gradually increases or decreases from 0, so that the acceleration shock or deceleration shock will be small.

On the other hand, when any of the following events (1)-(4) occurs, the actual relative speed Vr of the target vehicle to the own vehicle may discontinuously change.

(1) During the driving of the own vehicle at a constant speed, a preceding vehicle is newly selected as the target vehicle to track.

(2) An intervening vehicle, which intervenes (or cuts in) between the target vehicle and the own vehicle, replaces the target vehicle to become a new target vehicle.

(3) An override operation made by the driver during the tracking control is completed. The override operation may be an operation of the accelerator pedal for accelerating the own vehicle or an operation of the brake pedal for decelerating the own vehicle.

(4) The tracking switch 20 is operated by the driver of the own vehicle to initiate the tracking control.

Moreover, when the actual relative speed Vr of the target vehicle to the own vehicle discontinuously changes upon occurrence of any of the above events (1)-(4), if the relative speed gain $\alpha$ in Equation (1) was set to the reference gain calculated as in the normal tracking control, the target acceleration Atgt of the own vehicle would also discontinuously change. Consequently, a large acceleration shock or deceleration shock might occur due to a rapid change in the target acceleration Atgt of the own vehicle.

Therefore, in the present embodiment, when any of the above events (1)-(4) occurs, the vehicle driving control apparatus 50 performs, instead of setting the relative speed gain $\alpha$ in Equation (1) to the reference gain, a process of correcting the relative speed gain $\alpha$ for reducing the acceleration shock or deceleration shock due to the tracking control.

In addition, in practice, the target acceleration Atgt is set based not only on the relative speed gain $\alpha$ and the actual relative speed Vr but also on the difference between the target inter-vehicle distance and the actual inter-vehicle distance between the target vehicle and the own vehicle. However, since the target acceleration Atgt depends more on the relative speed gain $\alpha$ and the actual relative speed Vr than on the difference between the target inter-vehicle distance and the actual inter-vehicle distance, in the present embodiment, for the sake of simplicity, the target acceleration Atgt is explained as being set based only on the relative speed gain $\alpha$ and the actual relative speed Vr.

[Correction in Accelerating the Own Vehicle]

Figure 2:
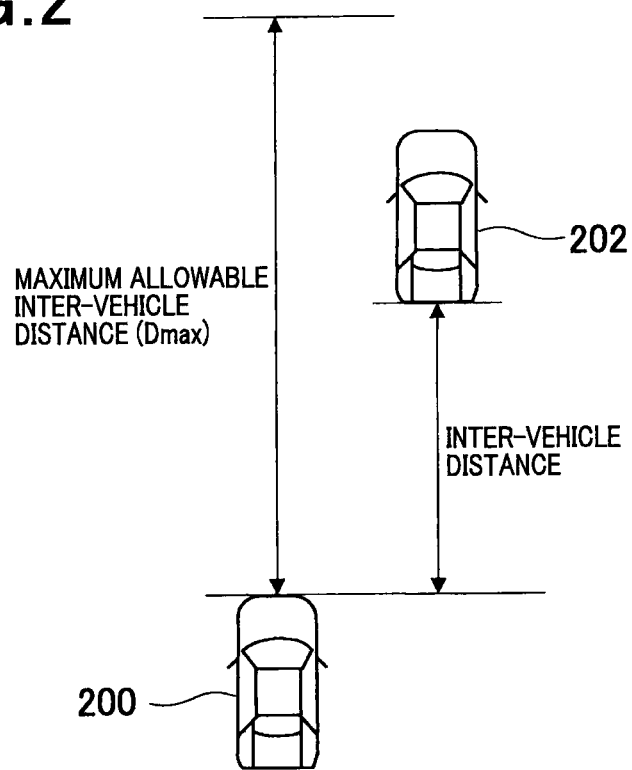
FIG. 2 is a schematic view illustrating the relationship between a maximum allowable inter-vehicle distance and the inter-vehicle distance between an own vehicle and a target vehicle in accelerating the own vehicle to track the target vehicle.
Figure 3:
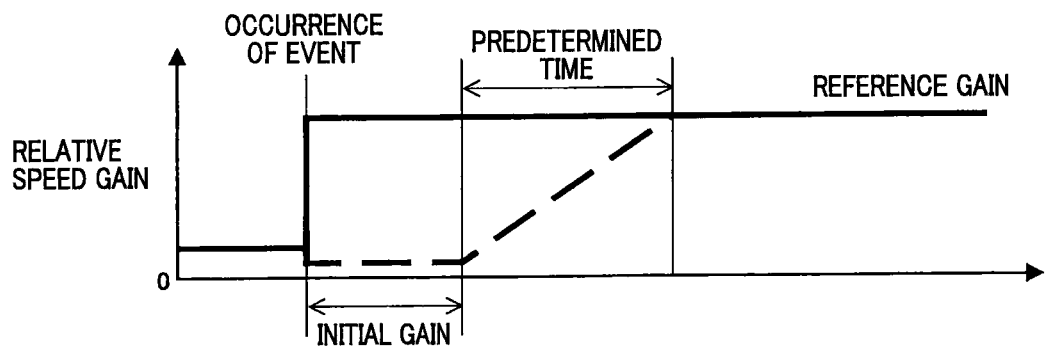
FIG. 3 is a time chart illustrating the corrected relative speed gain in accelerating the own vehicle to track the target vehicle and in decelerating the own vehicle to track the target vehicle.

Referring to FIG. 2, when the actual relative speed Vr of the target vehicle 202 to the own vehicle 200 is positive (i.e., the target vehicle 202 gets further from the own vehicle 200) upon occurrence of any of the above-described events (1)-(4), if the inter-vehicle distance between the target vehicle 202 and the own vehicle 200 is shorter than or equal to a maximum allowable inter-vehicle distance Dmax, the vehicle driving control apparatus 50 sets the relative speed gain $\alpha$ in Equation (1) to an initial gain. As shown in FIG. 3, the initial gain is less than the reference gain that is calculated as in the normal tracking control when the event occurs.

In the present embodiment, the initial gain in accelerating the own vehicle 200 to track the target vehicle 202 is set as follows.

Figure 4:
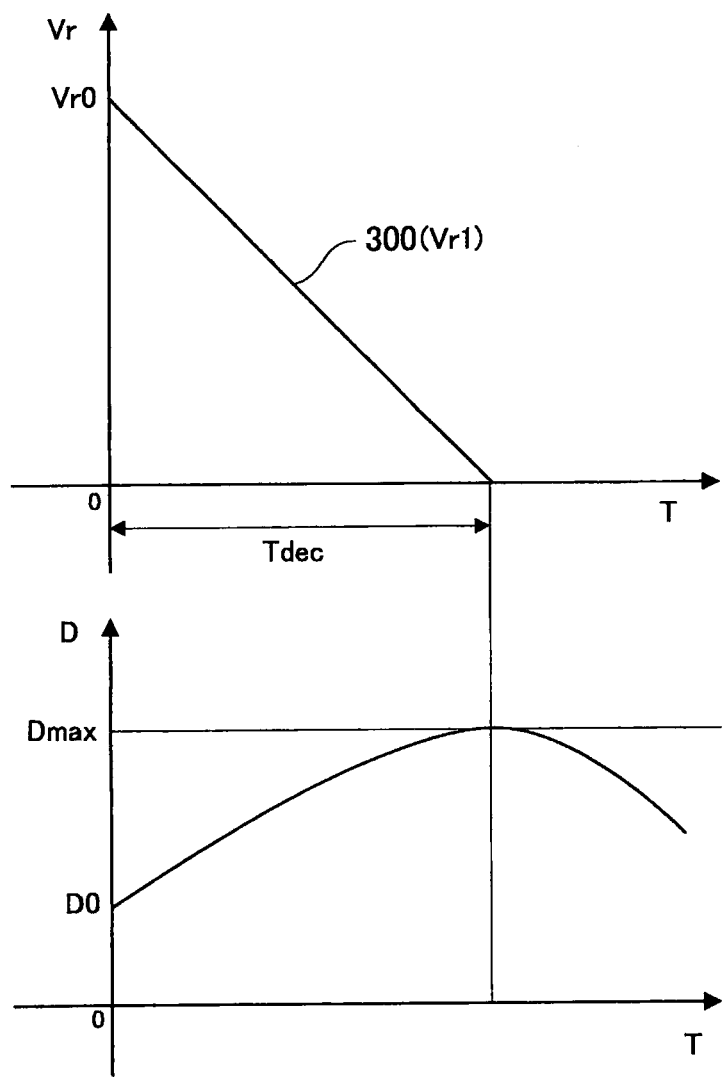
FIG. 4 is a time chart illustrating both the change with time of a first estimated relative speed and the change with time of the inter-vehicle distance between the own vehicle and the target vehicle in accelerating the own vehicle to track the target vehicle.

Referring to FIG. 4, when the actual relative speed Vr of the target vehicle 202 to the own vehicle 200 is positive upon occurrence of any of the above-described events (1)-(4), the vehicle driving control apparatus 50 sets the target acceleration Atgt so as to decrease the actual relative speed Vr from an initial relative speed Vr0 at the time of occurrence of the event to 0 for a time period Tdec. In this case, the target acceleration Atgt can be expressed by the following Equation (2):

$$Atgt=Vr0/Tdec \quad (2)$$

Moreover, let D0 be the inter-vehicle distance between the target vehicle 202 and the own vehicle 200 at the time of occurrence of the event and $\Delta D$ be the difference between Dmax and D0. Then the relationship between D0, Dmax, $\Delta D$, Tdec and Vr0 can be expressed by the following Equation (3):

$$D\max-D0=\Delta D=Tdec \times Vr0/2 \quad (3)$$

Based on the above Equations (2) and (3), the initial gain $\alpha 0$ can be calculated by the following Equation (4):

$$\alpha 0=1/Tdec=Vr0/(2 \times \Delta D) \quad (4)$$

FIG. 4 shows both the change with time of an estimated relative speed 300 of the target vehicle 202 to the own vehicle 200 and the change with time of the inter-vehicle distance D between the target vehicle 202 and the own vehicle 200 when the target acceleration Atgt is supposed to be unchanged from the value determined by Equation (2). Here, the estimated relative speed 300 is a first estimated relative speed for the actual relative speed Vr of the target vehicle 202 to the own vehicle 200.

However, in fact, the actual relative speed Vr of the target vehicle 202 to the own vehicle 200 is decreased from the initial relative speed Vr0 to 0; thus the target acceleration Atgt set to the product of the initial gain $\alpha 0$ calculated by Equation (4) and the actual relative speed Vr is not kept constant at the value determined by Equation (2), but gradually changed to approach 0.

Therefore, an estimated relative speed, which is obtained by setting the relative speed gain $\alpha$ in Equation (1) to the initial gain $\alpha 0$ calculated by Equation (4), is changed more gradually to approach 0 than the estimated relative speed 300 shown in FIG. 4. Consequently, the time required for the estimated relative speed to become 0 and for the inter-vehicle distance D to become equal to the maximum allowable inter-vehicle distance Dmax will be longer than Tdec.

However, in the present embodiment, for the sake of simplicity, the following explanation is made on the supposition that the estimated relative speed and the inter-vehicle distance D change as shown in FIG. 4.

During the time period for which the relative speed gain $\alpha$ is set to the initial gain $\alpha 0$, the inter-vehicle distance D between the target vehicle 202 and the own vehicle 200 increases from D0 to the maximum allowable inter-vehicle distance Dmax. Therefore, in the present embodiment, the maximum allowable inter-vehicle distance Dmax is set based on the speed of the own vehicle 200 and the distance mode selected by the tacking mode switch 22 so as to prevent the target vehicle 202 from leaving too far from the own vehicle 200.

Moreover, upon the inter-vehicle distance D reaching the maximum allowable inter-vehicle distance Dmax, as shown in FIG. 3, the vehicle driving control apparatus 50 gradually increases the relative speed gain $\alpha$ in Equation (1) from the initial gain $\alpha 0$ to the reference gain at a predetermined rate of increase for a predetermined time. Here, the reference gain is calculated based on the speed of the own vehicle 200 and the inter-vehicle distance D between the target vehicle 202 and the own vehicle 200 as in the normal tracking control. Consequently, with the relative speed gain $\alpha$ being gradually increased, the inter-vehicle distance D will be gradually decreased from the maximum allowable inter-vehicle distance Dmax to the target inter-vehicle distance. Finally, upon the reaching of the relative speed gain α to the reference gain, the vehicle driving control apparatus 50 terminates the process of correcting the relative speed gain α and resumes the normal tracking control.

Furthermore, in the present embodiment, the initial gain α0 calculated by Equation (4) is further corrected when there is a change in the speed of the target vehicle 202 after occurrence of the event.

Specifically, when the speed of the target vehicle 202 is changed after occurrence of the event, the actual relative speed Vr of the target vehicle 202 to the own vehicle 200 will be deviated from the estimated relative speed 300.

Figure 5:
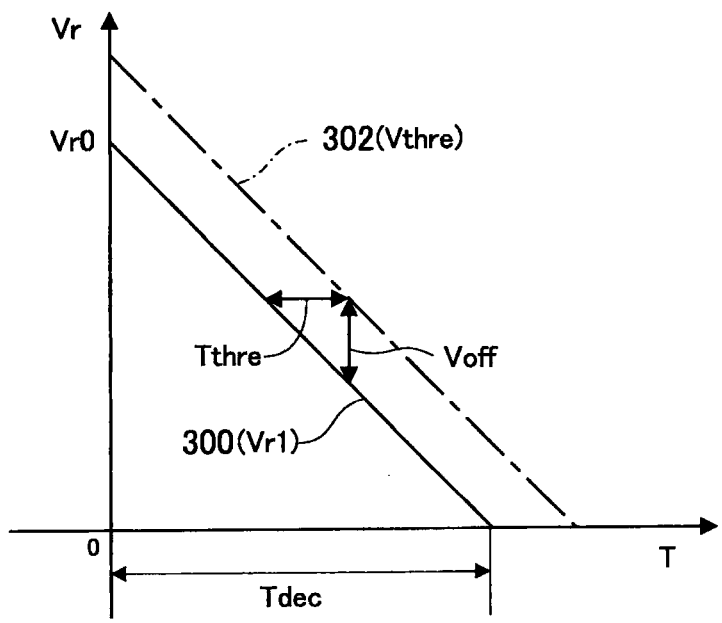
FIG. 5 is a schematic view illustrating the relationship between the first estimated relative speed and a first correction threshold in accelerating the own vehicle to track the target vehicle.

Referring to FIG. 5, let Vr1 be the estimated relative speed 300 at time T after start of the relative speed gain correction by setting the relative speed gain α to the initial gain α0, Tthre be a predetermined delay time up to which change of the actual relative speed Vr is allowed to be delayed with respect to change of the estimated relative speed 300, Voff be a predetermined increase of the actual relative speed Vr with respect to the estimated relative speed 300 when change of the actual relative speed Vr is delayed by the predetermined delay time Tthre with respect to change of the estimated relative speed 300 and Vthre be a first correction threshold 302 which is obtained by adding Voff to the estimated relative speed 300. Then the first correction threshold 302 (Vthre) can be expressed by the following Equation (5):

$$Vthre=Vr1+Voff \quad (5)$$

Here, the first correction threshold 302 (Vthre) is a threshold for determining whether or not to set the relative speed gain α to the reference gain instead of to the initial gain α0 when the actual relative speed Vr is deviated upward from the estimated relative speed 300 (Vr1). That is, when the actual relative speed Vr is deviated upward from the estimated relative speed 300 (Vr1) to become higher than or equal to the first correction threshold 302 (Vthre), the relative speed gain α will be set to the reference gain instead of to the initial gain α0.

However, if the relative speed gain α is set to the reference gain when the actual relative speed Vr is deviated upward from the estimated relative speed 300 (Vr1) to become higher than or equal to the first correction threshold 302 (Vthre), change of the relative speed gain α will be discontinuous and thus may cause the target acceleration Atgt to rapidly change. Therefore, it is preferable to gradually change the relative speed gain α from the initial gain α0 to the reference gain when the actual relative speed Vr is deviated upward from the estimated relative speed 300 (Vr1) to approach the first correction threshold 302 (Vthre).

Accordingly, in the present embodiment, when the actual relative speed Vr is higher than the estimated relative speed 300 (Vr1) and lower than the first correction threshold 302 (Vthre), the vehicle driving control apparatus 50 first calculates a position coefficient m of the actual relative speed Vr with respect to the first correction threshold 302 (Vthre) by the following Equation (6):

$$m=(Vthre-Vr)/Voff \quad (6)$$

Then, the vehicle driving control apparatus 50 further corrects the initial gain α0 to obtain a relative speed gain αm by the following Equation (7):

$$\alpha m=m\times\alpha 0+(1-m)\times abs \quad (7)$$

where abs is the reference gain.

It can be seen from Equations (6) and (7) that the further the actual relative speed Vr is from the first correction threshold 302 (Vthre), in other words, the closer the actual relative speed Vr is to the estimated relative speed 300 (Vr1), the closer the position coefficient m is to 1 and thus the closer the relative speed gain αm is to the initial gain α0.

In addition, in the present embodiment, when the actual relative speed Vr is deviated downward from the estimated relative speed 300 (Vr1) to become lower than the estimated relative speed 300 (Vr1), the vehicle driving control apparatus 50 does not further correct the initial gain α0 calculated by Equation (4).

[Correction in Decelerating the Own Vehicle]

Figure 6:
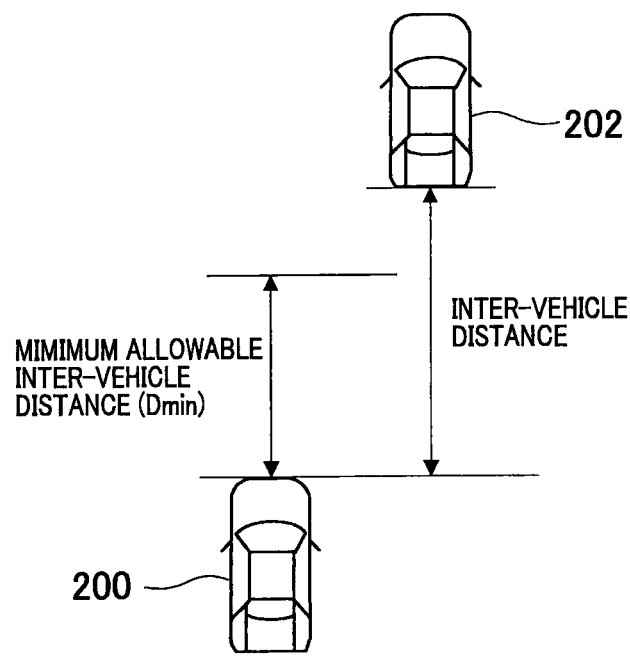
FIG. 6 is a schematic view illustrating the relationship between a minimum allowable inter-vehicle distance and the inter-vehicle distance between the own vehicle and the target vehicle in decelerating the own vehicle to track the target vehicle.

Referring to FIG. 6, when the actual relative speed Vr of the target vehicle 202 to the own vehicle 200 is negative (i.e., the target vehicle 202 gets closer to the own vehicle 200) upon occurrence of any of the above-described events (1)-(4), if the inter-vehicle distance between the target vehicle 202 and the own vehicle 200 is longer than or equal to a minimum allowable inter-vehicle distance Dmin, the vehicle driving control apparatus 50 sets the relative speed gain α in Equation (1) to an initial gain. As shown in FIG. 3, the initial gain is less than the reference gain that is calculated as in the normal tracking control when the event occurs.

In the present embodiment, the initial gain in decelerating the own vehicle 200 to track the target vehicle 202 is set as follows.

Figure 7:
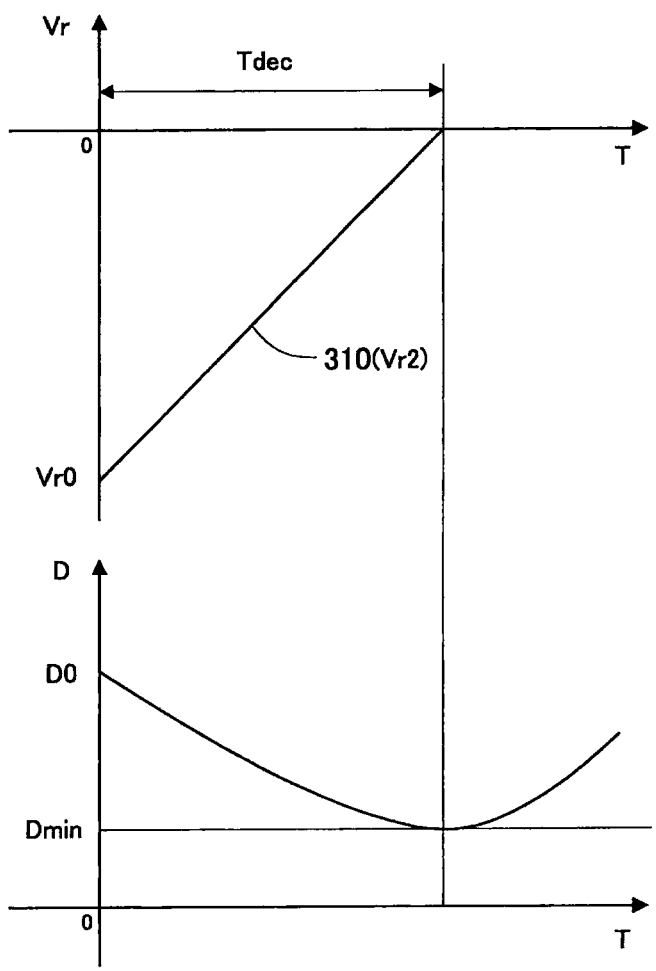
FIG. 7 is a time chart illustrating both the change with time of a second estimated relative speed and the change with time of the inter-vehicle distance between the own vehicle and the target vehicle in decelerating the own vehicle to track the target vehicle.

Referring to FIG. 7, when the actual relative speed Vr of the target vehicle 202 to the own vehicle 200 is negative upon occurrence of any of the above-described events (1)-(4), the vehicle driving control apparatus 50 sets the target acceleration Atgt so as to increase the negative actual relative speed Vr from an initial relative speed Vr0 at the time of occurrence of the event to 0 for a time period Tdec. In this case, the target acceleration Atgt can also be expressed by the above-described Equation (2).

Moreover, let D0 be the inter-vehicle distance between the target vehicle 202 and the own vehicle 200 at the time of occurrence of the event and ΔD be the difference between D0 and Dmin. Then the relationship between D0, Dmin, ΔD, Tdec and Vr0 can be expressed by the following Equation (8):

$$D0-Dmin=\Delta D=-Tdec\times Vr0/2 \quad (8)$$

Based on the above Equations (2) and (8), the initial gain α0 can be calculated by the following Equation (9):

$$\alpha 0=1/Tdec=-Vr0/(2\times\Delta D) \quad (9)$$

Further, let |Vr0| be the absolute value of the initial relative speed Vr0. Then the above Equations (4) and (9) can be combined into the following Equation (10):

$$\alpha 0=|Vr0|/(2\times\Delta D) \quad (10)$$

FIG. 7 shows both the change with time of an estimated relative speed 310 of the target vehicle 202 to the own vehicle 200 and the change with time of the inter-vehicle distance D between the target vehicle 202 and the own vehicle 200 when the target acceleration Atgt is supposed to be unchanged from the value determined by Equation (2). Here, the estimated relative speed 310 is a second estimated relative speed for the actual relative speed Vr of the target vehicle 202 to the own vehicle 200.

However, in fact, the actual relative speed Vr of the target vehicle 202 to the own vehicle 200 is increased from the initial relative speed Vr0 to 0; thus the target acceleration Atgt set to the product of the initial gain α0 calculated by Equation (9) and the actual relative speed Vr is not kept constant at the value determined by Equation (2), but gradually changed to approach 0.

Therefore, an estimated relative speed, which is obtained by setting the relative speed gain α in Equation (1) to the initial gain α0 calculated by Equation (9), is changed more gradually to approach 0 than the estimated relative speed 310 shown in FIG. 7. Consequently, the time required for the estimated relative speed to become 0 and for the inter-vehicle distance D to become equal to the minimum allowable inter-vehicle distance Dmin will be longer than Tdec.

However, in the present embodiment, for the sake of simplicity, the following explanation is made on the supposition that the estimated relative speed and the inter-vehicle distance D change as shown in FIG. 7.

During the time period for which the relative speed gain α is set to the initial gain α0, the inter-vehicle distance D between the target vehicle 202 and the own vehicle 200 decreases from D0 to the minimum allowable inter-vehicle distance Dmin. Therefore, in the present embodiment, the minimum allowable inter-vehicle distance Dmin is set based on the speed of the own vehicle 200 and the distance mode selected by the tacking mode switch 22 so as to prevent the target vehicle 202 from approaching too close to the own vehicle 200.

Moreover, upon the reaching of the inter-vehicle distance D to the minimum allowable inter-vehicle distance Dmin, as shown in FIG. 3, the vehicle driving control apparatus 50 gradually increases the relative speed gain α in Equation (1) from the initial gain α0 to the reference gain at a predetermined rate of increase for a predetermined time. Here, the reference gain is calculated based on the speed of the own vehicle 200 and the inter-vehicle distance D between the target vehicle 202 and the own vehicle 200 as in the normal tracking control. Consequently, with the relative speed gain α being gradually increased, the inter-vehicle distance D will be gradually increased from the minimum allowable inter-vehicle distance Dmin to the target inter-vehicle distance. Finally, upon the reaching of the relative speed gain α to the reference gain, the vehicle driving control apparatus 50 terminates the process of correcting the relative speed gain α and resumes the normal tracking control.

Furthermore, in the present embodiment, the initial gain α0 calculated by Equation (9) is further corrected when there is a change in the speed of the target vehicle 202 after occurrence of the event.

Specifically, when the speed of the target vehicle 202 is changed after occurrence of the event, the actual relative speed Vr of the target vehicle 202 to the own vehicle 200 will be deviated from the estimated relative speed 310.

Figure 8:
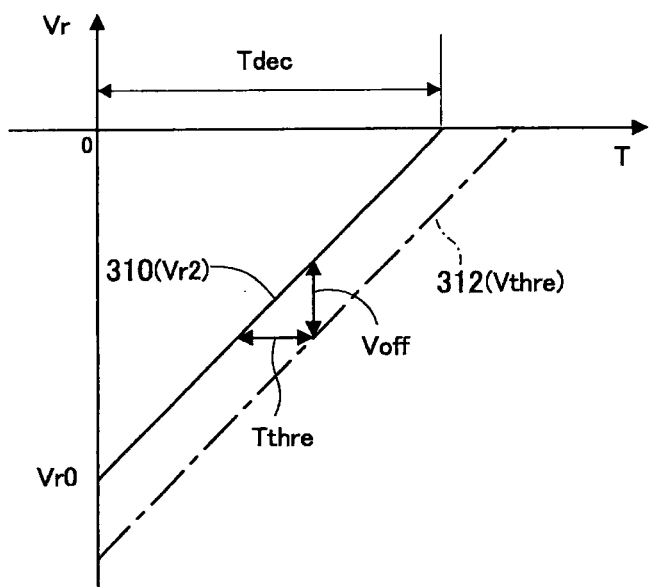
FIG. 8 is a schematic view illustrating the relationship between the second estimated relative speed and a second correction threshold in decelerating the own vehicle to track the target vehicle.

Referring to FIG. 8, let Vr2 be the estimated relative speed 310 at time T after start of the relative speed gain correction by setting the relative speed gain α to the initial gain α0, Tthre be a predetermined delay time up to which change of the actual relative speed Vr is allowed to be delayed with respect to change of the estimated relative speed 310, Voff be a predetermined decrease of the actual relative speed Vr with respect to the estimated relative speed 310 when change of the actual relative speed Vr is delayed by the predetermined delay time Tthre with respect to change of the estimated relative speed 310 and Vthre be a second correction threshold 312 which is obtained by subtracting Voff from the estimated relative speed 310. Then the second correction threshold 312 (Vthre) can be expressed by the following Equation (11):

$$Vthre = Vr2 - Voff \quad (11)$$

Here, the second correction threshold 312 (Vthre) is a threshold for determining whether or not to set the relative speed gain α to the reference gain instead of to the initial gain α0 when the actual relative speed Vr is deviated downward from the estimated relative speed 310 (Vr2). That is, when the actual relative speed Vr is deviated downward from the estimated relative speed 310 (Vr2) to become lower than or equal to the second correction threshold 312 (Vthre), the relative speed gain α will be set to the reference gain instead of to the initial gain α0.

However, if the relative speed gain α is set to the reference gain when the actual relative speed Vr is deviated downward from the estimated relative speed 310 (Vr2) to become lower than or equal to the second correction threshold 312 (Vthre), change of the relative speed gain α will be discontinuous and thus may cause the target acceleration Atgt to rapidly change. Therefore, it is preferable to gradually change the relative speed gain α from the initial gain α0 to the reference gain when the actual relative speed Vr is deviated downward from the estimated relative speed 310 (Vr2) to approach the second correction threshold 312 (Vthre).

Accordingly, in the present embodiment, when the actual relative speed Vr is lower than the estimated relative speed 310 (Vr2) and higher than the second correction threshold 312 (Vthre), the vehicle driving control apparatus 50 first calculates a position coefficient m of the actual relative speed Vr with respect to the second correction threshold 312 (Vthre) by the following Equation (12):

$$m = (Vr - Vthre)/Voff \quad (12)$$

Then, the vehicle driving control apparatus 50 further corrects the initial gain α0 to obtain a relative speed gain αm by the following Equation (13):

$$\alpha m = m \times \alpha 0 + (1-m) \times abs \quad (13)$$

where abs is the reference gain.

It can be seen from Equations (12) and (13) that the further the actual relative speed Vr is from the second correction threshold 312 (Vthre), in other words, the closer the actual relative speed Vr is to the estimated relative speed 310 (Vr2), the closer the position coefficient m is to 1 and thus the closer the relative speed gain αm is to the initial gain α0.

In addition, in the present embodiment, when the actual relative speed Vr is deviated upward from the estimated relative speed 310 (Vr2) to become higher than the estimated relative speed 310 (Vr2), the vehicle driving control apparatus 50 does not further correct the initial gain α0 calculated by Equation (9).

Next, the tracking control process according to the present embodiment will be described in detail with reference to FIG. 9. This process is performed by the CPU of the vehicle driving control apparatus 50 by executing a program stored in the ROM or flash memory of the apparatus 50. In addition, this process is constantly repeated when the tracking switch 20 is in an ON state.

First, at step S400, the vehicle driving control apparatus 50 determines whether any of the above-described events (1)-(4) has occurred. In other words, when any of the above-described events (1)-(4) has occurred, the vehicle driving control apparatus 50 detects the occurrence of the event at this step.

If the determination at step S400 results in a "NO" answer, then the process proceeds to step S420.

At step S420, if there is already a preceding vehicle selected as the target vehicle, the vehicle driving control apparatus 50 sets the relative speed gain α to the reference gain. Then, the apparatus 50 calculates the target acceleration Atgt by Equation (1). Thereafter, the apparatus 50 controls, via the engine ECU 30 and the brake ECU 40, driving of the own vehicle based on the calculated target acceleration Atgt, thereby making the own vehicle track the target vehicle.

In contrast, at step S420, if there is no preceding vehicle selected as the target vehicle, the vehicle driving control apparatus 50 sets the target acceleration Atgt based on the difference between the preset target vehicle speed and the actual speed of the own vehicle sensed by the vehicle speed sensor 14. Then, the apparatus 50 controls, via the engine ECU 30 and the brake ECU 40, driving of the own vehicle based on the set target acceleration Atgt, thereby bringing the actual speed of the own vehicle into agreement with the target vehicle speed.

On the other hand, if the determination at step S400 results in a "YES" answer, then the process proceeds to step S401.

At step S401, the vehicle driving control apparatus 50 acquires both the actual relative speed of the target vehicle to the own vehicle and the inter-vehicle distance between the target vehicle and the own vehicle. More specifically, at this step, as described previously, the vehicle driving control apparatus 50 acquires the inter-vehicle distance between the target vehicle and the own vehicle from the radar sensor 10 and calculates the actual relative speed of the target vehicle to the own vehicle based on the change with time of the inter-vehicle distance.

At step S402, the vehicle driving control apparatus 50 further determines whether a first correction condition is satisfied. Here, the first correction condition is such that the actual relative speed of the target vehicle to the own vehicle is positive and the inter-vehicle distance between the target vehicle and the own vehicle is shorter than or equal to the maximum allowable inter-vehicle distance Dmax.

If the determination at step S402 results in a "YES" answer, then the process proceeds to step S404.

At step S404, the vehicle driving control apparatus 50 sets a correction flag to 1. Then, at step S406, the vehicle driving control apparatus 50 performs a first gain correction in which the relative speed gain α in Equation (1) is set to the initial gain α0 calculated by Equation (4). Thereafter, the process proceeds to step S420.

In addition, at step S406, if the actual relative speed of the target vehicle to the own vehicle is deviated upward from the first estimated relative speed (i.e., the estimated relative speed 300 (Vr1) in FIG. 5), the vehicle driving control apparatus 50 further corrects the initial gain α0 to obtain the relative speed gain αm (see Equations (6) and (7)) and sets the relative speed gain α in Equation (1) to the relative speed gain αm.

On the other hand, if the determination at step S402 results in a "NO" answer, then the process proceeds to step S408.

At step S408, the vehicle driving control apparatus 50 further determines whether a second correction condition is satisfied. Here, the second correction condition is such that the actual relative speed of the target vehicle to the own vehicle is negative and the inter-vehicle distance between the target vehicle and the own vehicle is longer than or equal to the minimum allowable inter-vehicle distance Dmin.

If the determination at step S408 results in a "YES" answer, then the process proceeds to step S410.

At step S410, the vehicle driving control apparatus 50 sets the correction flag to 1. Then, at step S412, the vehicle driving control apparatus 50 performs a second gain correction in which the relative speed gain α in Equation (1) is set to the initial gain α0 calculated by Equation (9). Thereafter, the process proceeds to step S420.

In addition, at step S412, if the actual relative speed of the target vehicle to the own vehicle is deviated downward from the second estimated relative speed (i.e., the estimated relative speed 310 (Vr2) in FIG. 8), the vehicle driving control apparatus 50 further corrects the initial gain α0 to obtain the relative speed gain αm (see Equations (12) and (13)) and sets the relative speed gain α in Equation (1) to the relative speed gain αm.

On the other hand, if the determination at step S408 results in a "NO" answer, then the process proceeds to step S414.

At step S414, the vehicle driving control apparatus 50 sets the correction flag to 0. Then, at step S416, the vehicle driving control apparatus 50 further determines whether the correction flag has been changed from 1 to 0 at step S414.

If the determination at step S416 results in a "NO" answer, in other words, if neither of the first and second correction conditions at steps S402 and S408 has been satisfied and thus the correction flag has not been set to 1 at either of steps S404 and S410 before step S414, then the process directly proceeds to step S420 without performing step S418. Further, in this case, at step S420, the vehicle driving control apparatus 50 calculates the target acceleration Atgt by Equation (1) with the relative speed gain α set to the reference gain.

In contrast, if the determination at step S416 results in a "YES" answer, in other words, if either of the first and second correction conditions at steps S402 and S408 has been satisfied and thus the correction flag has been set to 1 at either of steps S404 and S410 before step S414, then the process proceeds to step S418.

At step S418, the vehicle driving control apparatus 50 performs a third gain correction in which the relative speed gain α in Equation (1) is gradually increased from the initial gain α0 to the reference gain. Thereafter, the process proceeds to step S420.

At step S420, the vehicle driving control apparatus 50 calculates the target acceleration Atgt by Equation (1). Then, the vehicle driving control apparatus 50 controls, via the engine ECU 30 and the brake ECU 40, driving of the own vehicle based on the calculated target acceleration Atgt.

At step S422, the vehicle driving control apparatus 50 further determines whether the correction flag is equal to 0.

If the determination at step S422 results in a "YES" answer, then the process returns to step S400. In contrast, if the determination at step S422 results in a "NO" answer, then the process returns to step S401.

In addition, at step S400, all the results caused by the previous determination at step S400 are cleared.

With the above tracking control process, for example, when the event (1) has occurred (i.e., a preceding vehicle is newly selected as the target vehicle to track), the determination at step S400 will result in a "YES" answer.

Further, when the actual relative speed of the target vehicle to the own vehicle is positive and the inter-vehicle distance between the target vehicle and the own vehicle is longer than the maximum allowable inter-vehicle distance Dmax, all the determinations at steps S402, S408 and S416 will result in a "NO" answer. Consequently, the process will directly proceed to step S420 without performing any of the first to the third gain corrections at steps S406, S412 and S418.

Moreover, in this case, the vehicle driving control apparatus 50 will set the relative speed gain α to the reference gain and calculate the target acceleration Atgt by Equation (1). Further, the vehicle driving control apparatus 50 will compare the target acceleration Atgt with a target acceleration calculated based on the target vehicle speed and perform the tracking control with the smaller one of the two target accelerations.

Otherwise, when the actual relative speed of the target vehicle to the own vehicle is negative and the inter-vehicle distance between the target vehicle and the own vehicle is shorter than the minimum allowable inter-vehicle distance Dmin, all the determinations at steps S402, S408 and S416 will result in a "NO" answer. Consequently, the process will directly proceed to step S420 without performing any of the first to the third gain corrections at steps S406, S412 and S418.

Moreover, in this case, the vehicle driving control apparatus 50 will set the relative speed gain α to the reference gain and calculate the target acceleration Atgt by Equation (1). Consequently, with the actual relative speed being negative, the calculated target acceleration Atgt will also be negative. That is, when the actual relative speed is negative and the inter-vehicle distance is shorter than the minimum allowable inter-vehicle distance Dmin, the vehicle driving control apparatus 50 will immediately decelerate the own vehicle, thereby preventing the own vehicle from approaching (or getting closer to) the target vehicle.

The above-described vehicle driving control apparatus 50 according to the present embodiment has the following advantages.

In the present embodiment, the vehicle driving control apparatus 50 is configured to: (1) acquire the actual relative speed Vr of the target vehicle 202 to the own vehicle 200 (see step S401 of FIG. 9); (2) set the target acceleration Atgt of the own vehicle 200 based on the product of the relative speed gain α and the actual relative speed Vr (see Equation (1) and step S420 of FIG. 9); (3) detect occurrence of an event (e.g., any of the above-described events (1)-(4)) which causes the target acceleration Atgt to discontinuously change (see step S400 of FIG. 9); and (4) correct, upon detection of occurrence of the event, the relative speed gain α so as to gradually increase the relative speed gain α from the initial gain α0 that is less than the reference gain abs (see steps S406, S412 and S418 of FIG. 9).

Consequently, by correcting the relative speed gain α in the above manner, it is possible to prevent the target acceleration Atgt from being rapidly changed due to occurrence of the event. As a result, it is possible to reduce the acceleration shock or deceleration shock caused by the tracking control when the event occurs.

Further, in the present embodiment, the vehicle driving control apparatus 50 corrects the relative speed gain α so as to gradually increase the relative speed gain α from the initial gain α0 to the reference gain abs.

Consequently, it is possible to secure a smooth transition from the tracking control with the corrected relative speed gain α to the normal tracking control with the reference gain abs.

Figure 9:
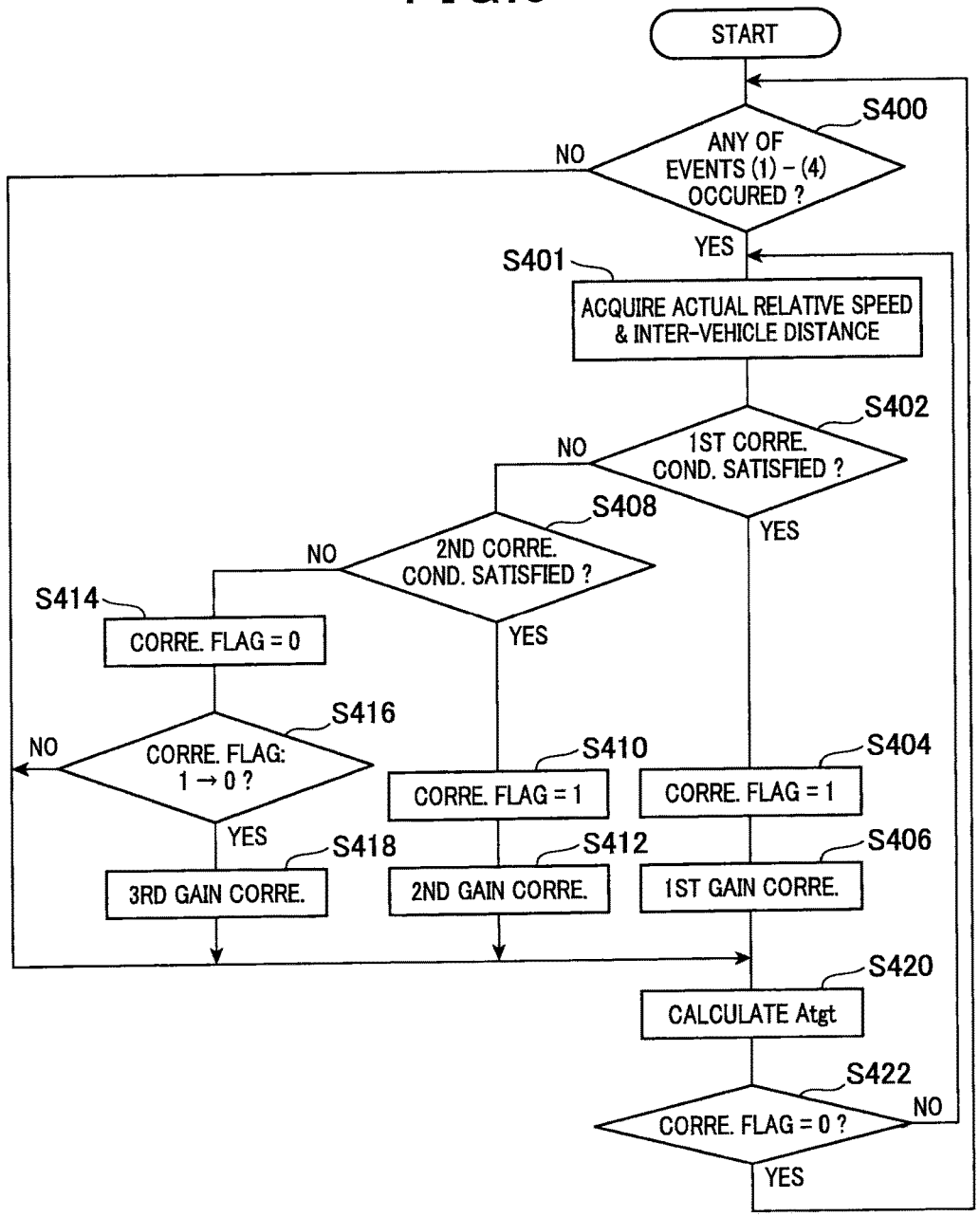
FIG. 9 is a flow chart illustrating a tracking control process performed by the vehicle driving control apparatus.

In the present embodiment, the vehicle driving control apparatus 50 is further configured to acquire the inter-vehicle distance D between the target vehicle 202 and the own vehicle 200 (see step S401 of FIG. 9). Moreover, the initial gain α0 is set by the following equation (i.e., Equation (10)): $α0=|Vr0|/(2×ΔD)$, where $|Vr0|$ represents the absolute value of the actual relative speed Vr0 of the target vehicle 202 to the own vehicle 200 at the time of occurrence of the event, and ΔD represents the difference between the maximum allowable inter-vehicle distance Dmax and the inter-vehicle distance D between the target vehicle 202 and the own vehicle 200 when the actual relative speed Vr is positive upon occurrence of the event and represents the difference between the inter-vehicle distance D and the minimum allowable inter-vehicle distance Dmin when the actual relative speed Vr is negative upon occurrence of the event.

Setting the initial gain α0 as above, it is possible to more reliably prevent the target acceleration Atgt from being rapidly changed due to occurrence of the event.

In the present embodiment, upon detection of occurrence of the event, the vehicle driving control apparatus 50 sets the relative speed gain α to the initial gain α0 as long as the first or the second correction condition is satisfied and then gradually increases the relative speed gain α from the initial gain α0. The first correction condition is such that the actual relative speed Vr of the target vehicle 202 to the own vehicle 200 is positive and the inter-vehicle distance D between the target vehicle 202 and the own vehicle 200 is shorter than or equal to the maximum allowable inter-vehicle distance Dmax. The second correction condition is such that the actual relative speed Vr is negative and the inter-vehicle distance D is longer than or equal to the minimum allowable inter-vehicle distance Dmin.

With the above configuration, it is possible to more effectively reduce the acceleration shock or deceleration shock caused by the tracking control when the event occurs.

In the present embodiment, when the actual relative speed Vr of the target vehicle 202 to the own vehicle 200 is positive and higher than or equal to the first correction threshold 302 (Vthre), the vehicle driving control apparatus 50 sets the relative speed gain α to the reference gain abs instead of to the initial gain α0. When the actual relative speed Vr is positive and higher than the first estimated relative speed 300 (Vr1) and lower than the first correction threshold 302 (Vthre), the apparatus 50 corrects the initial gain α0 so that the closer the actual relative speed Vr is to the first correction threshold 302 (Vthre), the closer the corrected initial gain αm is to the reference gain abs. Moreover, when the actual relative speed Vr1 is negative and lower than or equal to the second correction threshold 312 (Vthre), the apparatus 50 sets the relative speed gain α to the reference gain abs instead of to the initial gain α0. When the actual relative speed Vr is negative and lower than the second estimated relative speed 310 (Vr2) and higher than the second correction threshold 312 (Vthre), the apparatus 50 corrects the initial gain α0 so that the closer the actual relative speed Vr is to the second correction threshold 312 (Vthre), the closer the corrected initial gain αm is to the reference gain abs.

With the above configuration, it is possible to prevent a discontinuous change in the relative speed gain α, thereby preventing a rapid change in the target acceleration Atgt.

In the present embodiment, the vehicle driving control apparatus 50 sets the reference gain abs based on the inter-vehicle distance D between the target vehicle 202 and the own vehicle 200 and the speed of the own vehicle 200.

Setting the reference gain abs as above, it is possible to reliably keep the inter-vehicle distance D at the target inter-vehicle distance in the normal tracking control.

While the above particular embodiment has been shown and described, it will be understood by those skilled in the art that various modifications, changes, and improvements may be made without departing from the spirit of the invention.

For example, in the previous embodiment, the vehicle driving control apparatus 50 corrects the relative speed gain α so as to gradually increase the relative speed gain α from the initial gain α0 that is calculated by Equation (10) (or Equations (4) and (9)). However, the vehicle driving control apparatus 50 may be modified to correct the relative speed gain α so as to gradually increase the relative speed gain α from a fixed value (e.g., 0) that is less than the reference gain abs.

Moreover, in the previous embodiment, upon detection of occurrence of any of the events (1)-(4), the vehicle driving control apparatus 50 sets the relative speed gain α to the initial gain α0 as long as the first or the second correction condition is satisfied and then gradually increases the relative speed gain α from the initial gain α0. However, the vehicle driving control apparatus 50 may be modified to gradually increase the relative speed gain α from the initial gain α0 immediately after detection of occurrence of any of the events (1)-(4).

What is claimed is:

1. A vehicle driving control apparatus for controlling an own vehicle to track a target vehicle, the target vehicle being a preceding vehicle which runs ahead of the own vehicle and is selected by the vehicle driving control apparatus to be tracked by the own vehicle, the vehicle driving control apparatus comprising:
   means for acquiring an actual relative speed of the target vehicle to the own vehicle;
   means for detecting occurrence of an event, the event being one of: (i) a different preceding vehicle being selected by the vehicle driving control apparatus as the target vehicle; (ii) an intervening vehicle becoming the target vehicle by intervening between the preceding vehicle and the own vehicle; (iii) an override operation being completed by a driver of the own vehicle by accelerating or decelerating the own vehicle; and (iv) a tracking control being initiated by the driver of the own vehicle;
   means for setting a target acceleration of the own vehicle based on the product of a relative speed gain and the actual relative speed acquired by the acquiring means, the relative speed gain being set to a reference gain when occurrence of the event has not been detected by the detecting means; and
   means for correcting, in response to detection of occurrence of the event by the detecting means, the relative speed gain to increase, at a predetermined rate of increase for a predetermined time, the relative speed gain from a value that is less than the reference gain.

2. The vehicle driving control apparatus as set forth in claim 1, wherein the correcting means corrects the relative speed gain so as to increase, at the predetermined rate of increase for the predetermined time, the relative speed gain from the value to the reference gain.

3. The vehicle driving control apparatus as set forth in claim 1, further comprising means for acquiring an inter-vehicle distance between the target vehicle and the own vehicle,
   wherein the correcting means corrects the relative speed gain so as to increase, at the predetermined rate of increase for the predetermined time, the relative speed gain from an initial gain that is calculated by the following equation:

$$\alpha 0 = |Vr0|/(2 \times \Delta D),$$

where α0 represents the initial gain, |Vr0| represents the absolute value of the actual relative speed of the target vehicle to the own vehicle at the time of occurrence of the event, and ΔD represents the difference between a maximum allowable inter-vehicle distance and the inter-vehicle distance between the target vehicle and the own vehicle when the actual relative speed of the target vehicle to the own vehicle is positive upon occurrence of the event and represents the difference between the inter-vehicle distance and a minimum allowable inter-vehicle distance when the actual relative speed is negative upon occurrence of the event.

4. The vehicle driving control apparatus as set forth in claim 3, wherein upon detection of occurrence of the event by the detecting means, the correcting means sets the relative speed gain to the initial gain as long as a first or a second correction condition is satisfied and then increases, at the predetermined rate of increase for the predetermined time, the relative speed gain from the initial gain,
   the first correction condition being such that the actual relative speed of the target vehicle to the own vehicle is positive and the inter-vehicle distance between the target vehicle and the own vehicle is shorter than or equal to the maximum allowable inter-vehicle distance,
   the second correction condition being such that the actual relative speed of the target vehicle to the own vehicle is negative and the inter-vehicle distance between the target vehicle and the own vehicle is longer than or equal to the minimum allowable inter-vehicle distance.

5. The vehicle driving control apparatus as set forth in claim 4, wherein when the actual relative speed of the target vehicle to the own vehicle is positive and higher than or equal to a first correction threshold, the correcting means sets the relative speed gain to the reference gain instead of to the initial gain,
   when the actual relative speed of the target vehicle to the own vehicle is positive and higher than a first estimated relative speed and lower than the first correction threshold, the correcting means corrects the initial gain so that the closer the actual relative speed is to the first correction threshold, the closer the corrected initial gain is to the reference gain, the first estimated relative speed being obtained by supposing that the target acceleration of the own vehicle is kept constant, the first correction threshold being higher than the first estimated relative speed by a predetermined amount,
   when the actual relative speed of the target vehicle to the own vehicle is negative and lower than or equal to a second correction threshold, the correcting means sets the relative speed gain to the reference gain instead of to the initial gain,
   when the actual relative speed of the target vehicle to the own vehicle is negative and lower than a second estimated relative speed and higher than the second correction threshold, the correcting means corrects the initial gain so that the closer the actual relative speed is to the second correction threshold, the closer the corrected initial gain is to the reference gain, the second estimated relative speed being obtained by supposing that the target acceleration of the own vehicle is kept constant, the second correction threshold being lower than the second estimated relative speed by a predetermined amount.

6. The vehicle driving control apparatus as set forth in claim 1, further comprising means for acquiring an inter-vehicle distance between the target vehicle and the own vehicle, wherein the reference gain is set by the setting means based on the inter-vehicle distance between the target vehicle and the own vehicle and a speed of the own vehicle.

\* \* \* \* \*